United States Patent Office 3,483,407
Patented Dec. 9, 1969

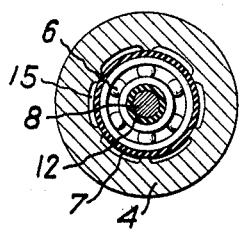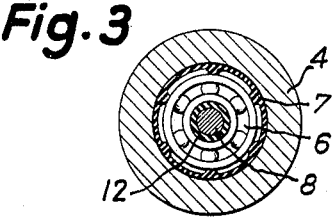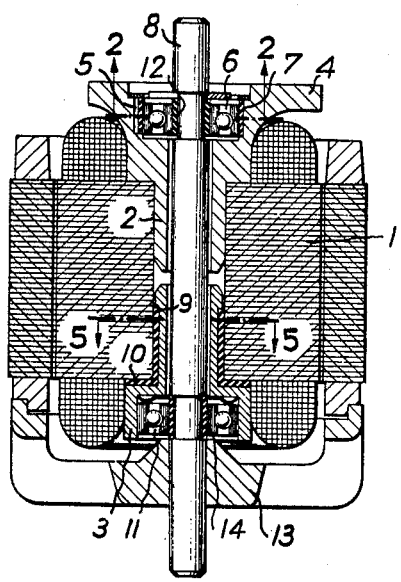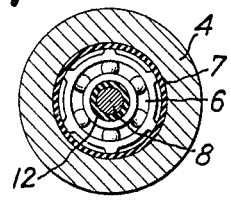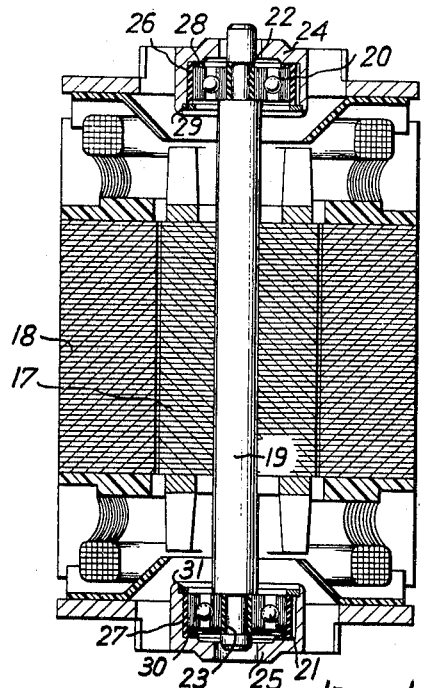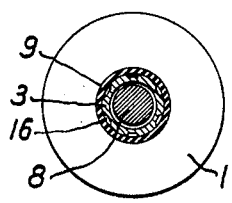
Inventors:
Klaus Frohmüller
Dieter Helms

3,483,407
EXTERNAL AND INTERNAL ROTOR ELECTRIC MOTORS WITH VIBRATION DAMPERS
Klaus Frohmüller and Dieter Helms, Oldenburg, Germany, assignors to Licentia Patent-Verwaltungs-G.m.b.H., Frankfurt am Main, Germany
Filed Nov. 14, 1967, Ser. No. 682,850
Claims priority, application Germany, Nov. 14, 1966,
L 55,050
Int. Cl. H02k 5/24
U.S. Cl. 310—51          15 Claims

ABSTRACT OF THE DISCLOSURE

A small electric motor, suitable for use in recording and office equipment, having a ball bearing mounted external or internal rotor. The outer race of at least one of the ball bearings is surrounded by a spacer made of deformable elestic material which is operative to damp the transmission of noise vibrations from the ball bearing to the motor stator. The bearing bracket of the other ball bearing, if that ball bearing is not surrounded by a spacer, is separated from the motor stator by another vibration damping spacer. The spacers used in the present invention may be arranged so that at least one of its major surfaces does not lie flat against its supporting surface. In this way the spacers are permitted to deform while performing their damping function.

BACKGROUND OF THE INVENTION

The present invention relates to electric motors of the type used in sound reproduction systems, business machines and the like, the rotors of which turn in ball bearings having an elastic spacer for the reduction of noise. More particularly, the present invention relates to motors, having either internal or external ball bearing mounted rotors, which are both small in size and emit the minimum of noise.

Electric motors of the type used in recording equipment, office equipment or the like must be designed to meet special limitations placed on their cost, their size and on the noise they emit during operation. Office equipment or equipment of this general kind usually has an exceedingly limited space in which a drive motor can be accommodated. For this reason it is necessary that the drive motor be of compact construction. The quality specifications relating to the operational noise, as well as the requirement that a drive motor be capable of mass production at reasonable cost also have a direct effect on its construction. These three design requirements are difficult to meet, simultaneously, however, and have considerably slowed the evolutional development of this type of motor.

Because of these requirements, for example, the switch from exclusive employment of friction bearings to the use of ball bearings has been delayed since ball bearings require a greater amount of space and generate more noise. It has been necessary, as a result of the latter characteristic of ball bearings to provide the bearings with damping devices which require even additional space.

SUMMARY OF THE INVENTION

An object of the invention, therefore, is to design an electric motor having either an internal or an external ball bearing mounted rotor, which is compactly constructed yet extremely silent in operation.

This and other objects, which will become apparent in the discussion that follows, are achieved, according to the present invention, by mounting each of the ball bearings of the motor in a cup or recess in a bearing bracket which is attached to the stator laminations, and introducing a specially designed vibration damping spacer either between a ball bearing and its corresponding bearing bracket cup or a bearing bracket and the supporting stator laminations.

The external rotor motor embodiment of the present invention includes, for example, a group of stator laminations having a hole through its center and two sleeves, inserted from opposite ends of the hole which open into cups, at the points between the coil ends, for holding the ball bearings. One of the sleeves extends further outward to form a mounting flange beyond the bearing cup and has a vibration damping spacer inserted in the bearing cup which grips the bearing. The other sleeve directly grips the ball bearing itself but has a cylindrical vibration damping spacer surrounding the portion thereof which is inserted in the laminations.

The internal rotor motor embodiment of the present invention includes a group of stator laminations which surround the rotor having, at each end, a bearing plate holding a ball bearing in a small cup or recess. A vibration damping spacer is inserted between the ball bearing and the bearing plate, in each case, to prevent the transmission of bearing noise to the stator.

The vibration damping spacer, according to the present invention, may be splined either on its inside or outside, or the inside surface of the bearing cup or outer race of the bearing itself may be provided with ridges so that at least one spacer side does not lie flat against the bearing or bearing plate.

According to a particular variation of the present invention the inner race of the ball bearings in either the external or internal rotor motor are mounted on vibration damping impregnated fabric to prevent the transmission of ball bearing noise to the rotor shaft.

According to still another feature of the present invention the resilient spacers are made of a highly self-damping rubber-elastic material which has a shock resilience of less than 10%, a low "compression set" and a mechanical firmness sufficient to prevent the rotor shaft from deflecting outwards even when operative to damp the maximum amplitudes of vibration.

The present invention makes it possible to construct a small external rotor motor of the type used in recording or office equipment having minimum dimensions in both the axial and the radial direction. The noise generated by the ball bearings is damped, first, by means of the elastic spacer which is arranged to surround the ball bearing located in the motor mounting flange and, second, by means of the elastic spacer between the stator laminations and the bearing mounting sleeve which lies opposite the motor mounting flange.

BRIEF DESCRIPTION OF THE DRAWINGS

FIGURE 1 is a cross-sectional elevational view of an electric motor having an external rotor, ball bearings, and vibration dampers according to the present invention.

FIGURE 2 is a cross-sectional view taken along line 2—2 in the motor of FIGURE 1 showing one embodiment of the vibration damping arrangement according to the present invention.

FIGURE 3 is a cross-sectional view taken along line 2—2 in the motor of FIGURE 1 showing another embodiment of the vibration damping arrangement according to the present invention.

FIGURE 4 is a cross-sectional view taken along line 2—2 in the motor of FIGURE 1 showing another embodiment of the vibration damping arrangement according to the present invention.

FIGURE 5 is a cross-sectional view taken along line 5—5 in the electric motor of FIGURE 1 showing one embodiment of the vibration damping arrangement on the sleeve opposite the mounting flange.

FIGURE 6 is a cross-sectional view of an electric motor having an internal rotor supported by a ball bearing vibrational damping arrangement according to the present invention.

DESCRIPTION OF THE PREFERRED EMBODIMENTS

Turning now to the drawings, there is shown in FIGURE 1 an electric motor of the type having an external rotor; this motor includes a vibration damping arrangement according to the present invention. The motor includes a group of stator laminations 1 arranged as a hollow cylinder containing sleeves 2 and 3 for the rotor shaft 8, the upper sleeve 2 opens outward, above the motor, forming a mounting flange. The sleeve 2 also includes a cup or cavity 5, a portion of which is between the coil ends, which serves to hold the ball bearing 6. This cup is cylindrical in shape and may, for example, be provided with axially running grooves 15 which form a spline as shown in FIGURE 2. Between the bearing cup and the outer race of the ball bearing 6 is a resilient spacer 7 which is in direct contact only with the ridges of the spline of the bearing cup 5, as shown in FIGURE 2. It is also conceivable to provide the spacer 7 itself with an internal spline holding the ball bearing outer race or, conversely, to spline the surface of the ball bearing outer race which contacts the spacer 7. Both of these alternative embodiments will be discussed in further detail in connection with FIGURES 3 and 4, respectively.

All of the spline arrangements mentioned above serve to permit the elastic deformation of the spacer so that it may maintain its vibration damping characteristics. The rubber elastic material of which the spacer is made is neither compressible nor elastic when it is tightly clamped and restrained on all sides.

On the other side of the group of stator laminations 1 there is arranged a sleeve 3 which opens into a bearing cup between the coil ends as does the sleeve 2. Into this bearing cup is pressed the ball bearing 11. A resilient spacer 9 is located between the sleeve 3 and the group of stator laminations 1. This spacer is suitably cylindrical in shape and has a collar 10 arranged on one side to provide damping between the flanged out portion of the sleeve 3 and the stator laminations 1. The outer surface of the cylindrical portion of the sleeve 3, which comes in contact with the spacer 9, is also splined as illustrated in FIGURE 5. This arrangement too, serves the purpose of permitting the elastic deformation of the spacer 9.

Both ball bearings 6 and 11 are mounted on the rotor shaft 8 on top of impregnated fabric bushings 12 and 14. These impregnated fabric bushings serve to prevent the ball bearing generated vibrations from reaching the shaft. The bushings 12 and 14 are slotted and glued in grooves in the rotor shaft 8. After the adhesive resin or glue has dried, these bushings are depressed down to size. Because the flange 13 of the bell-shaped rotor is mounted on the shaft 8, both ball bearings 6 and 11 must be pressed onto the shaft 8 from the end nearest the mounting flange 4. If the seat of the ball bearing 6 is constructed as an impregnated fabric bushing 12, as described, it is readily possible to make the inner diameters of both ball bearings the same and to slide the ball bearing 11 over the seat of the ball bearing 6.

FIGURE 2 illustrates a section taken along line 2—2 through the mounting flange 4 and the bearing 6. The ball bearing seat in the flange is provided with grooves 15 which permit the deformation of the vibration damping spacer 7.

FIGURE 3 illustrates a modified embodiment of the bearing seat in which the spacer 7 is provided with profile-like protruding ribs projecting toward the outer race of the ball bearing 6. These ribs likewise serve to permit the spacer to function as a vibration damper.

FIGURE 4 illustrates still another embodiment of the ball bearing seat arrangement wherein the ball bearing outer race has axially running grooves.

FIGURE 5 illustrates a cross section taken along line 5—5 through the sleeve 3 and the group of stator laminations 1. The sleeve 3 is provided with axially running grooves 16 along its outer cylindrical surface. These grooves 16 permit the elastic deformation of the spacer 9.

Turning now to FIGURE 6, which illustrates a motor with an internal rotor mounted on ball bearings, an example of how the advances according to the present invention may be applied—correspondingly modified—to an internal rotor motor will now be described.

The rotor 17 shown in FIGURE 6 turns within the stator 18. On the rotor shaft 19 are mounted the two ball bearings 20 and 21. Between the inner races of the bearings and the rotor shaft 19 are bushings 22 and 23 made of vibration damping material. This material may, for example, be impregnated fabric which, as has been described, permits machining. Between the outer races of the ball bearings 20 and 21 and the bearing plates 24 and 25 are arranged the spacers 26 and 27, respectively. The running noise of the two ball bearings 20 and 21 is damped by one of the bearing seat embodiments illustrated in FIGURES 2-4; that is, the bearing plates 24 and 25 are provided with axial grooves 15 (FIGURE 2), the spacers 26 and 27 are constructed with ribs (FIGURE 3) or the outer races of the ball bearings arranged with axial grooves (FIGURE 4) so that the spacers can elastically deform. Flat washers 28 and 29 as well as 30 and 31, made preferably of the same material as the spacers 26 and 27, abut each spacer and prevent the side surfaces of the ball bearings 20 and 21 from coming in contact with the bearing plates and, thus, transmitting the bearing noise.

It is also possible to construct the components 26, 28 and 29 as well as 27, 30 and 31 as complete integral parts.

It is possible too, to dispense with the grooves in the bearing plates, spacers or the ball bearing outer races, and permit the entire contact surfaces of the spacers to abut the bearing plates and ball bearings, by making the spacers out of a vibration damping material.

The material employed for the spacers 7, 9, and 10 as well as 26 to 31 must fulfill various requirements. It must be a rubber elastic substance having a high self-damping characteristic and a shock resilience of less than 10%. The hardness of the rubber is dependent upon the thickness of the spacer and upon the size of its bearing or contact surface; this hardness must be chosen to achieve the greatest vibration damping compatible with a mechanical firmness sufficient to prevent the rotor shaft from deffecting sideways as a result of the output drive. It is additionally important that the material have a so-called "compression set" which is very low; that is, that there be practically no lasting deformation and no "cold flow," as is common in the case of certain plastics, when the material is subjected to a force for a long period of time. An interpolymer of vinylidene fluoride and hexafluoropropylene has proven very serviceable as a spacer material.

The principal advantages of the present invention are the reduction in noise in low power ball bearing-type electric motors without a corresponding increase in motor size. In fact, the present invention shows a way in whch ball bearing noises can be practically eliminated in this type of motor.

The employment of ball bearings in this type of motor itself yields a number of advantages not found in the friction bearing motors of the prior art. The special machining, e.g. hardening, honing, lapping, of the rotor shafts which is required for friction bearings is no longer necessary. There results, therefore, a considerable saving in manufacturing cost. To this may be added the several advantages that ball bearings require less maintenance than friction bearings of similar capacity, that they exhibit lower friction losses both when the rotor is under load and when it is idling and that they exhibit less temperature dependence than friction bearings of similar capacity.

The arrangement of the rotor shaft bearings between the stator coil ends and arrangement of the motor mount at one end of the motor has made possible a considerable reduction in length of the external rotor motor without a reduction in power. This reduction in length is especially important with this kind of motor since the equipment which it is designed to drive has to be compactly constructed.

It will be understood that the above description of the present invention is susceptible to various modifications, changes, and adaptations, and the same are intended to be comprehended within the meaning and range of equivalents of the appended claims.

We claim:
1. An electric motor suitable for use in recording and office equipment comprising, in combination:
 (a) a group of stator laminations having a hole passing therethrough;
 (b) A rotor shaft extending into said hole;
 (c) a rotor arranged externally to said group of laminations and connected to said rotor shaft;
 (d) at least one ball bearing arranged on said rotor shaft to rotatably hold said shaft;
 (e) at least one means, connected to said group of stator laminations, for holding said ball bearing, said holding means including a hollow sleeve portion which is inserted in said hole around said rotor shaft and a cup portion which contains said ball bearing; and
 (f) at least one first spacer means, arranged between said ball bearing and said cup portion of at least one of said holding means, said spacer means being made of deformable elastic material and operative to damp the transmission of vibrations from said bearing to said holding means.

2. The motor defined in claim 1, wherein there are two holding means inserted into said hole, and wherein said cup portion of one of said holding means terminates in a motor mounting flange.

3. The motor defined in claim 2, wherein between said sleeve portion of the other of said holding means and said group of laminations there is a second spacer means, made of elastic deformable material, for damping the transmission of vibrations from said other holding means to said group of laminations.

4. The motor defined in claim 3, wherein second spacer means is cylindrical in shape and has a flange-like collar arranged at one end of said cylindrical shape.

5. The motor defined in claim 3, wherein said other holding means has grooves arranged on the external surface of said hollow sleeve portion, said grooves running parallel to the axis of said rotor.

6. The motor defined in claim 3, wherein said second spacer means has ribs arranged on at least one of said inner and outer surfaces.

7. The motor defined in claim 1, wherein said first spacer means is made of a material having high self-damping qualities.

8. The motor defined in claim 1, wherein said material is rubber-elastic, has high self-damping qualities, a shock resilience less than 10%, a low compression set and a mechanical firmness sufficient to prevent said shaft from deviating substantially from its normal position even when operative to damp said vibrations to the limit of its capacity.

9. The motor defined in claim 1, wherein at least one of said holding means includes a plurality of grooves on the surface of said holding means closest to said bearing, said grooves arranged parallel to the axis of said rotor.

10. The motor defined in claim 1, wherein the outer race of at least one of said ball bearings includes a plurality of grooves arranged parallel to the axis of said rotor.

11. The motor defined in claim 1, further comprising a bushing arranged between said shaft and said ball bearing, said bushing being made of machineable, vibration damping material.

12. The motor defined in claim 11, wherein said machineable material is impregnated fabric.

13. An electric motor suitable for use in recording and office equipment comprising, in combination:
 (a) a group of stator laminations;
 (b) a rotor mounted on a rotor shaft and arranged internally to said group of laminations;
 (c) at least one ball bearing, arranged on said rotor shaft to rotatably hold said shaft;
 (d) at least one means connected to said group of stator laminations for holding said bearings; and
 (e) at least one spacer means arranged between said ball bearing and at least one of said holding means, said spacer means being made of a deformable elastic material having high self-damping qualities and being operative to damp the transmission of vibrations from said ball bearing to said holding means.

14. an electric motor suitable for use in recording and office equipment comprising, in combination:
 (a) a rotor arranged on a rotor shaft;
 (b) at least one ball bearing, arranged on said shaft to rotatably hold said shaft;
 (c) a group of stator laminations;
 (d) at least one means connected to said group of stator laminations for holding said bearing; and
 (e) at least one first spacer means arranged between said ball bearing and at least one of said holding means, said spacer means being operative to damp the transmission of vibrations from said bearing to said holding means and being made of a deformable rubber-elastic material having high self-damping qualities, a shock resilience less than 10%, a low compression set and a mechanical firmness sufficient to prevent said shaft from deviating substantially from its normal position even when operative to damp said vibrations to the limit of its capacity.

15. The motor defined in claim 14, wherein said material is an interpolymer of vinylidene fluoride and hexafluoropropylene.

References Cited
UNITED STATES PATENTS

| 2,238,435 | 4/1941 | Perry | 310—51 X |
| 2,471,812 | 5/1949 | Christiano | 310—51 |
| 2,752,514 | 6/1956 | Schwenden | 310—90 X |
| 2,929,944 | 3/1960 | Shewmon | 310—67 |
| 3,107,946 | 10/1963 | Drake | 308—8 |

WARREN E. RAY, Primary Examiner

U.S. Cl. X.R.

310—67